W. L. Force,
Oyster Dredge.

Nº 27,213.  Patented Feb. 21, 1860.

Witnesses:
I. S. Spencer
J. W. Coombs

Inventor:
W. L. Force
per Munn & Attorneys

UNITED STATES PATENT OFFICE.

WM. L. FORCE, OF KEYPORT, NEW JERSEY.

IMPROVEMENT IN OYSTER-DREDGES.

Specification forming part of Letters Patent No. 27,213, dated February 21, 1860.

*To all whom it may concern:*

Be it known that I, W. L. FORCE, of Keyport, in the county of Monmouth and State of New Jersey, have invented a new and Improved Oyster-Dredge; and I do hereby declare that the following is a full, clear, and exact description of the same, reference being had to the accompanying drawings, forming a part of this specification, in which—

Figure 1:
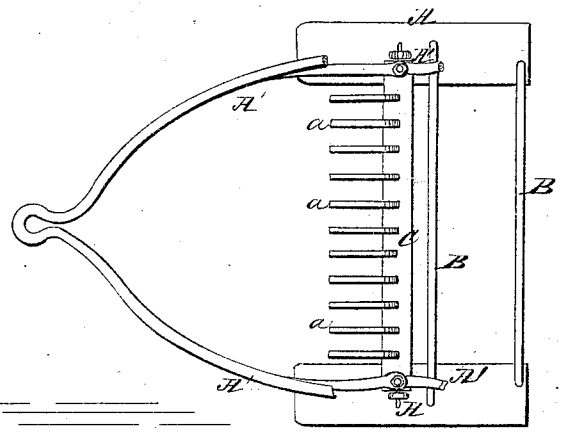
Figure 2:
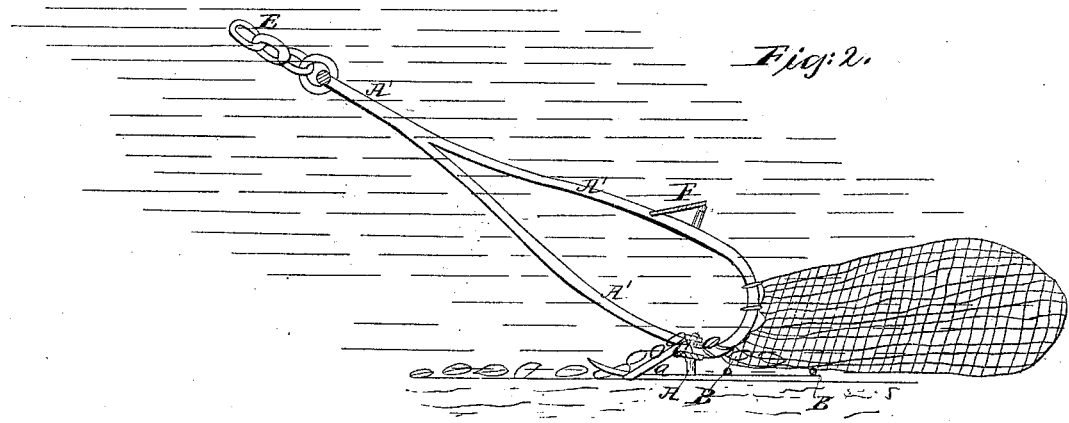
Figure 3:
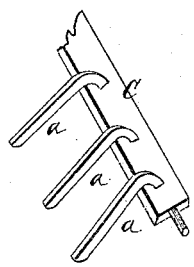

Figure 1 represents a plan view of my dredging-machine with a portion of the pointed thills removed to show the arrangement of the tines. Fig. 2 is a longitudinal section of Fig. 1, showing the operation of the invention. Fig. 3 is a section of the rake and head in perspective, showing the peculiar construction of the same.

Similar letters of reference indicate corresponding parts in the three figures.

This invention is an improvement in machines for dredging and gathering oysters from the beds of rivers where oyster-tongs cannot be used to advantage on account of the depth of water or from various circumstances.

It consists in supporting and hinging a peculiar-shaped rake upon sled-runners of sufficient width to prevent their sinking in the mud; and, in connection with the said rake upon runners, it further consists in arranging in a suitable manner upon the arms of the dredge a deflecting board, which is acted upon by the water so as to force the rake downward and keep it upon the bottom of the river, as will be hereinafter described.

My invention further consists in a peculiar construction of the rake, whereby great strength is obtained. At the same time the head of the rake will not form a barrier to the machine, as will be hereinafter described.

To enable those skilled in the art to fully understand my invention, I will proceed to describe its construction and operation.

In the drawings, A A represent two sled-runners of sufficient width to prevent their sinking into the mud. These have bars B B extending from one to the other for bracing them together, and by having the forward end of the runners bent up, as shown by Fig. 2, they can be drawn freely over the bed of the river. Upon these runners is suitably hinged or jointed the rake-head C, and to said jointed rake-head are attached two curved arms, A' A', to which a rope, E, Fig. 2, is attached, which rope proceeds up and is attached to the stern of a boat. Extending across from the upper portions of arms or thills A' A' is a deflecting board, F, which is simply a piece of sheet metal or wood of suitable width inclining toward the front of the machine, and fixed in its position with respect to the arms A' A'. Now the object of this board F is to keep the sled-runners hard down upon the bottom or bed of the river as the machine is drawn along. This is effected with a comparative light machine by the action of the water impinging against the surface of this board, which being in an inclined position, the pressure of the water upon its surface has a tendency to force the machine down, and by making said board wide enough the machine will be held down upon the bed of the river without adding any additional weight to the same by the water above; and by the employment of wide sled-runners, as above described, the rake-teeth will be prevented from digging or sinking so deep into the mud as to obstruct the movement of the machine.

The drag-net shown in Fig. 2 is hung on behind the machine, and as the machine is drawn along the bed of a river the oysters are raked up and pass over the rake-head into this bag or net, which, when it is filled, is drawn up and emptied into a boat and again sunk for another supply.

The rake for gathering up the oysters is constructed in a peculiar way, and in such a way that the head of the rake will not form an obstacle to the oysters and mud or cause either to bank up in front of the rake. At the same time sufficient strength can be given to the rake-head, as will now be described.

The head C is a flat bar of metal, which may be beveled toward its front edge, and this is hinged or pivoted to the runners A A and fixed to the handles A' A', so that its surface will be kept parallel, or nearly so, with the surface of the mud over which the machine is drawn. The teeth *a a*, forming the rake, are riveted or otherwise secured to the upper surface of the head C, and then bent over the head and brought down to their proper inclination. This arrangement will prevent either oysters or mud from banking up before the rake, and will thus remove any unnecessary draft from the machine.

Oyster-dredging is an operation usually performed in very deep water, where the depth is such that tongs cannot be profitably employed, and it necessarily requires a light, strong, and portable machine, to be easily managed by the oystermen from a boat. My machine possesses these advantages, combined with greater facility of raking the oysters in the drag-net, as above represented and described.

Having thus described my invention, what I claim, and desire to secure by Letters Patent, is—

1. The combination of the sled-runners A A and deflecting board F when the same are arranged in the manner and operate as set forth.

2. The flat-headed rake-head, in combination with the teeth $a$ $a$, when said teeth are bent over the front edge of the head, all in the manner and for the purposes herein set forth.

WILLIAM L. FORCE.

Witnesses:
AARON BEEDLE,
THOS. S. R. BROWN.